US009219746B2

(12) United States Patent
Blake et al.

(10) Patent No.: US 9,219,746 B2
(45) Date of Patent: Dec. 22, 2015

(54) RISK IDENTIFICATION BASED ON IDENTIFIED PARTS OF SPEECH OF TERMS IN A STRING OF TERMS

(71) Applicant: Bank of America Corporation, Charlotte, NC (US)

(72) Inventors: Adam James Blake, Charlotte, NC (US); Peter J. Langsam, San Francisco, CA (US); Jennifer Ann Zuhde, Nevada, TX (US); Thomas Bradley, Lyman, SC (US)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 14/014,731

(22) Filed: Aug. 30, 2013

(65) Prior Publication Data

US 2015/0067867 A1    Mar. 5, 2015

(51) Int. Cl.
*H04L 29/06* (2006.01)
*G06F 17/27* (2006.01)

(52) U.S. Cl.
CPC ............ *H04L 63/1433* (2013.01); *G06F 17/27* (2013.01); *H04L 63/1425* (2013.01)

(58) Field of Classification Search
CPC .............. H04L 63/1433; G06F 21/577; G06F 21/6245
USPC .......................................................... 726/25
See application file for complete search history.

(56) References Cited

U.S. PATENT DOCUMENTS

| | | | |
|---|---|---|---|
| 6,889,196 B1 * | 5/2005 | Clark ................. | G06Q 10/0631 705/7.12 |
| 7,181,438 B1 * | 2/2007 | Szabo | |
| 8,141,149 B1 * | 3/2012 | Henry et al. ..................... | 726/22 |
| 8,566,350 B2 * | 10/2013 | Chow et al. ..................... | 707/780 |
| 2002/0129140 A1 * | 9/2002 | Peled et al. ..................... | 709/224 |
| 2004/0193870 A1 * | 9/2004 | Redlich et al. ................. | 713/154 |
| 2007/0028297 A1 * | 2/2007 | Troyansky et al. .............. | 726/2 |
| 2007/0050844 A1 * | 3/2007 | Lebel .............................. | 726/13 |
| 2008/0243825 A1 * | 10/2008 | Staddon et al. .................... | 707/5 |
| 2009/0018820 A1 * | 1/2009 | Sato et al. ......................... | 704/9 |
| 2009/0070103 A1 * | 3/2009 | Beggelman ............ | G06F 17/27 704/9 |
| 2009/0113548 A1 * | 4/2009 | Gray et al. ....................... | 726/24 |
| 2011/0107205 A1 * | 5/2011 | Chow et al. ..................... | 715/255 |
| 2011/0184877 A1 * | 7/2011 | McHugh et al. ............... | 705/318 |
| 2011/0185056 A1 * | 7/2011 | McHugh et al. ............... | 709/224 |
| 2011/0191673 A1 * | 8/2011 | Ikawa et al. .................... | 715/273 |
| 2012/0046989 A1 * | 2/2012 | Baikalov et al. .............. | 705/7.28 |
| 2012/0066763 A1 * | 3/2012 | McHugh et al. ................. | 726/22 |
| 2012/0198556 A1 * | 8/2012 | Patel et al. ....................... | 726/25 |
| 2014/0033327 A1 * | 1/2014 | Conte ............................. | 726/28 |
| 2014/0129211 A1 * | 5/2014 | Kimelfeld ............. | G06F 17/271 704/9 |
| 2014/0172497 A1 * | 6/2014 | Kim ................... | G06Q 10/0635 705/7.28 |

* cited by examiner

*Primary Examiner* — Joseph P Hirl
*Assistant Examiner* — J. Brant Murphy
(74) *Attorney, Agent, or Firm* — Banner & Witcoff, Ltd.; Michael A. Springs (57) ABSTRACT

Systems, methods and apparatuses for analyzing a string of terms (e.g., a search query, text of an email, and the like) are provided. In some examples, a determination is made as to whether one or more terms in the string matches a keyword. If so, various parts of speech of one or more terms in the string of terms may be determined. In some examples, a category of risk of the terms for which the part of speech is identified may also be determined. A risk rating may then be determined for the string of terms based on the relationship between the terms (e.g., the parts of speech) and the category or categories identified. In some examples, one or more additional actions may be implemented based on the risk rating.

20 Claims, 7 Drawing Sheets

| RISK RATING | ADDITIONAL ACTION(S) |
|---|---|
| 1 | RESPONSE 1 |
| 2 | RESPONSE 2 |
| 3 | RESPONSE 3 |
| 4 | RESPONSE 4 |
| 5 | RESPONSE 5 |

FIG. 7

RISK IDENTIFICATION BASED ON IDENTIFIED PARTS OF SPEECH OF TERMS IN A STRING OF TERMS

BACKGROUND

Identifying and mitigating risk is a significant issue for companies today. One important aspect to identifying and mitigating risk is understanding how employees are using employer-provided computing devices. Accordingly, companies often monitor activity on these employer-provided devices. For instance, employers may monitor and evaluate search queries such as those input into an Internet search engine. In another example, employers may monitor email content of employees. Conventional systems of monitoring these activities include analyzing the content to determine whether any of the terms used match keywords identified as indicating risk. However, this system of identifying keywords results in many false positives because a word matching a keyword may be used as different parts of speech that may indicate different levels of risk. These conventional systems do not account for use of terms as different parts of speech and, thus, can provide inaccurate results.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for analyzing a string of terms (e.g., a search query, text of an email, and the like) and determining whether one of the terms matches a keyword. If so, various parts of speech of one or more terms in the string of terms may be determined. In some examples, a category of risk of the terms for which the part of speech is identified may also be determined. A risk rating may then be determined for the string of terms based on the relationship between the terms (e.g., the parts of speech) and the category or categories identified. In some examples, one or more additional actions may be implemented based on the risk rating.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Various aspects of the arrangements described herein are related to identifying risk associated with a string of terms, such as a search query or text of an electronic communication. The string of terms input by a user who may be an employee of an entity and the computing device into which the user is inputting the string of terms may be an entity-provided computing device for use by the user during the course of business. The string of terms may be analyzed to determine whether one or more predefined keywords are used. If so, a part of speech of one or more terms within the string of terms may be determined in order to identify the risk associated with the string. For instance, as will be discussed more fully below, some terms may be used as different parts of speech (e.g., noun or verb) and the risk rating associated with the term may be different based on how it is used in the string of terms (e.g., the part of speech of the term in the string being analyzed). Once a risk rating has been determined, one or more additional actions or additional processing of the string may be implemented in order to further understand and/or mitigate the risk. These and various other arrangements will be discussed more fully below.

Figure 1:
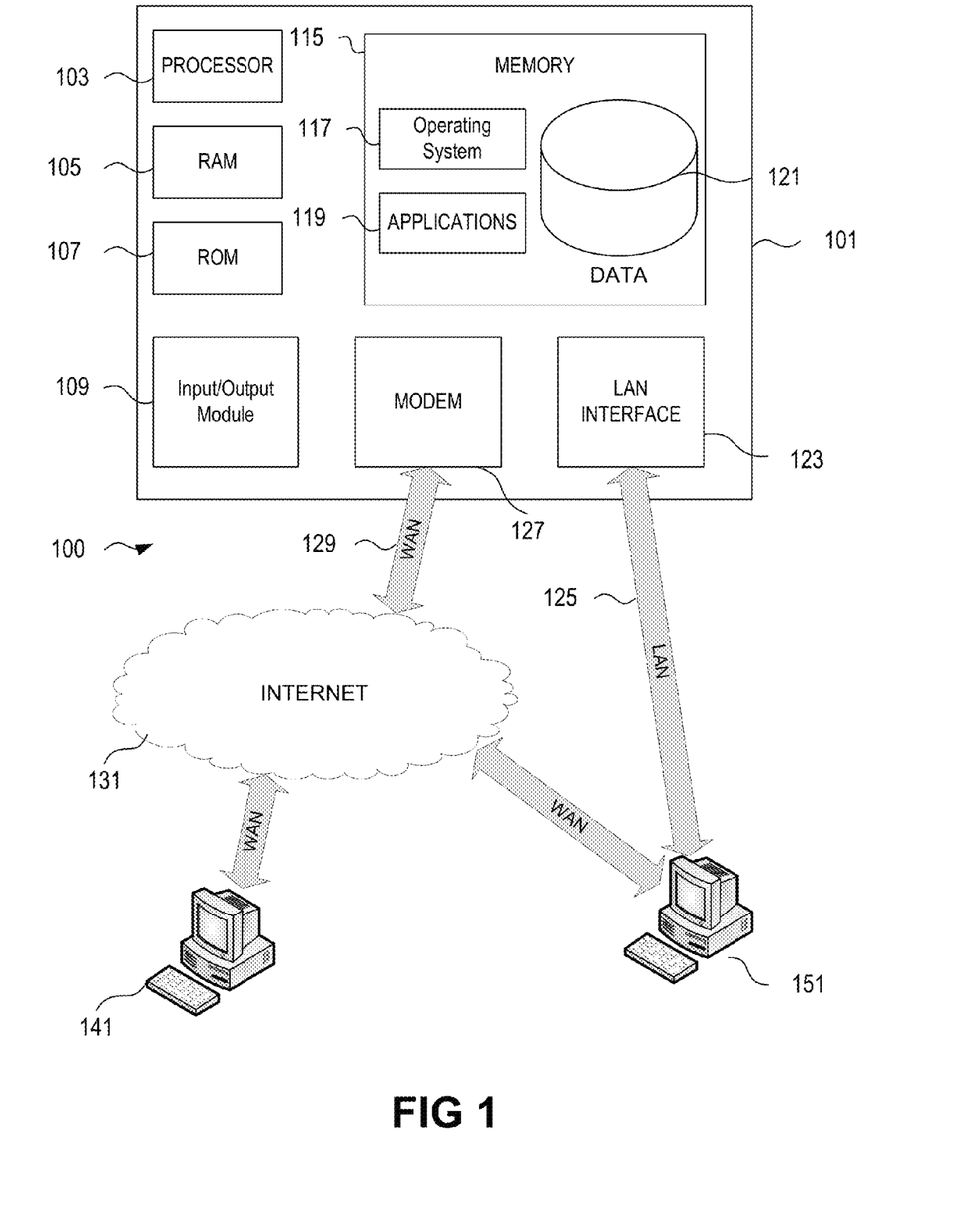
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
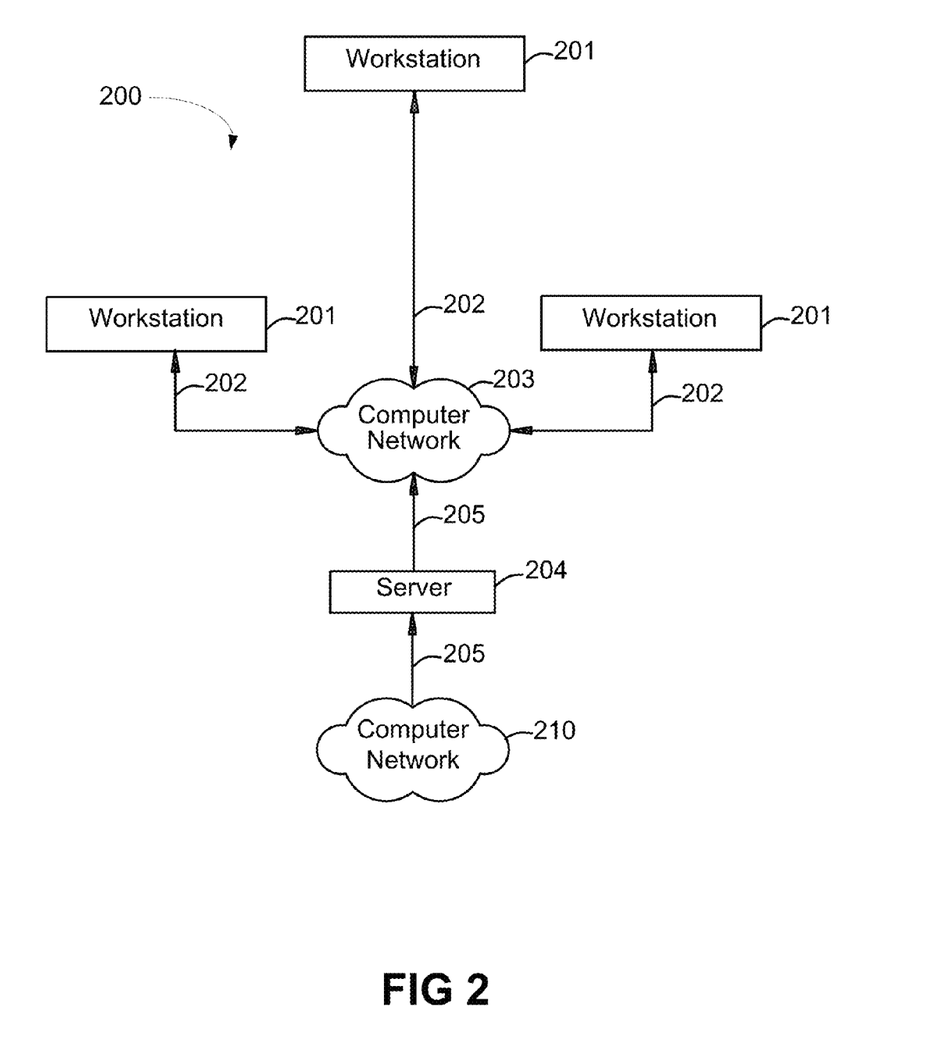
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
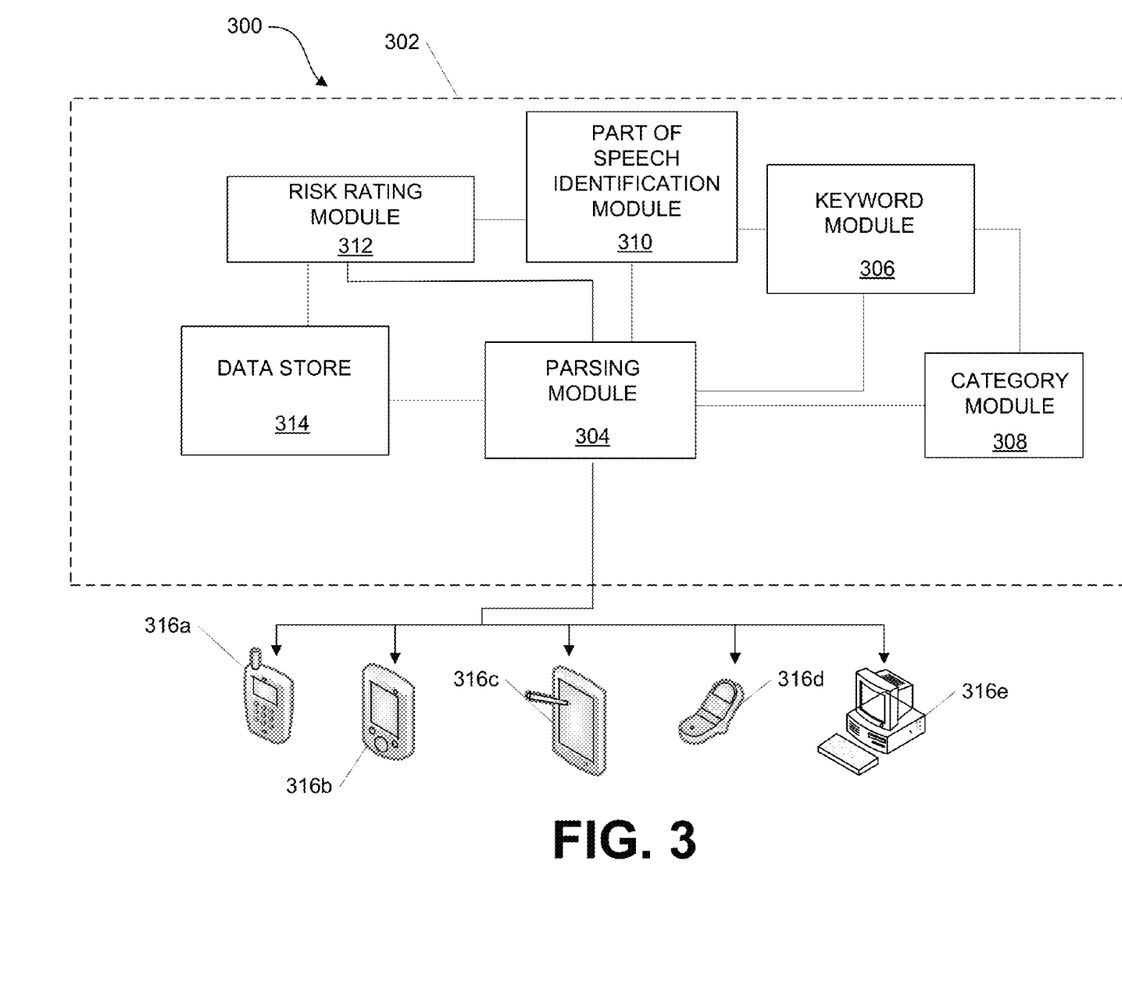
FIG. 3 illustrates an example risk identification system according to one or more aspects described herein.

FIG. 3 illustrates one example risk identification system for determining risk associated with one or more strings of terms according to one or more aspects described herein. The system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the risk identification system to use within a financial institution. Rather, the system 300, as well as various methods, and the like, described herein, may be implemented by various other types of entities without departing from the invention.

The risk identification system 300 may include one or more modules that may include hardware and/or software configured to perform various function within the system 300. For instance, the system may include parsing module 304. The parsing module 304 may receive data including, for example, strings of terms, such as search queries, text from emails or other electronic communications, and the like, and may parse the strings into individual words. In some examples, the parsing module 304 may receive data (e.g., search queries, text from communications, and the like) from one or more computing devices 316a-316e. The computing devices 316 may be provided to a user (e.g., an employee) by the entity 302 (e.g., an employer of the employee) for use during the course of business and may include a smartphone 316a, personal digital assistant (PDA) 316b, tablet computer 316c, cell phone 316d, computer terminal 316e, among other types of computing devices. As with many businesses, any use of the employer or entity-[provided computing device 316 may be monitored by the employer or entity. Accordingly, search queries, Internet usage, websites visited, content of email or other messages, and the like, may be monitored by the employer. In the arrangements described herein, the entity or employer may monitor these communications to identify a risk associated with any of the communications or activities of the user (e.g., an indication that a user intends to misuse company resources or sensitive information, an indication that a user is looking to leave his/her position, an indication that the user is attempting to circumvent one or more security measures implemented by the entity, and the like), as will be discussed more fully below.

The parsing module 304 may be connected to or in communication with a keyword module 306. The keyword module 306 may include data storage identifying one or more keywords. The keywords may be indicative of an increased risk. For instance, some example keywords may include, "block," "bypass," "confidential," and the like. Several other keywords may also be stored in the keyword module 306. The individual words from the data received by the parsing module may be analyzed to determine whether one or more of the words matches a keyword stored in the keyword module 306. In some examples, keywords may be identified by an administrator or other overseer of the system 300. In other examples, the keywords may be automatically stored based on historical data indicating a risk associated with certain words.

The risk identification system 300 may further include a part of speech module 308. The part of speech module may be connected to or in communication with the parsing module 304 and/or the keyword module 306. The part of speech module 308 may identify a part of speech of one or more individual words identified in the received data. For instance, if one word of the received word string matches a keyword, the part of speech of the word may be identified by the part of speech module 308. This may aid in determining the intent of the user inputting the search query, drafting the email, and the like. For instance, the term "bypass" may be identified as a keyword and the part of speech module 308 may determine whether "bypass" is used as a noun or a verb in the string. This may aid in determining whether there is a risk or a level of risk associated with the word string, search query, and the like. For instance, if "bypass" is used as a noun in a search query (e.g., "bypass around I-495") it may indicate less risk associated with the search query than if "bypass" is used as a verb (e.g., "bypass website block").

In another example, other words in the string (e.g., words other than a word matching a keyword) may be analyzed to determine a part of speech as well. For instance, continuing the example above, the term "block" may, in some examples, not match a keyword but as the search query is analyzed, the part of speech of "block" may be determined by the part of speech module 308 to further determine a risk associated with the search query. Accordingly, if "block" is used as a noun (as above "bypass website block") a greater risk may be associated with the search query than if "block" is used as a verb (e.g., "block crab grass growth").

The risk identification system 300 may further include a category module 310. The category module 310 may be connected to or in communication with one or more of the parsing module 304, keyword module 306, and/or part of speech module 308. The category module 310 may include one or more categories of terms that may indicate risk. For instance, keywords or terms may be sorted into categories such as intellectual property theft, information technology sabotage, unauthorized activity and/or behavior. Various other categories may be used without departing from the invention. In some examples, if two or more terms in a string are within the same category, that may indicate an increased risk associated with the string. For instance, if the identified noun and verb in a string are within a same category, there is a greater chance that the string is associated with activity not generally approved by the entity and, accordingly, a higher risk may be assigned to that string.

The risk identification system 300 may further include a risk rating module 312. The risk rating module 312 may be connected to or in communication with one or more of parsing module 304, keyword module 306, part of speech module 308 and/or category module 308. The risk rating module 312 may receive data from the one or more other modules and determine an overall risk associated with the word string. For instance, the risk rating module 312 may receive data associated with any keywords in the string, parts of speech of terms used, categories of the terms and whether any of the terms are in the same categories, and the like. A risk associated with the word string may be determined and the determined risk may be used to identify further processing for the word string and/or any additional steps taken, as will be discussed more fully below.

The risk identification system 300 may further include data storage module 314. Data storage module may include one or more databases storing terms, keywords, risk ratings, and the like. It may further include one or more processors and/or memory configured to identify additional keywords, refine risk ratings, and the like, based on historical data stored therein. For example, the data storage module 314 may be configured to provide rule defined learning for the system to improve accuracy of the risk ratings.

Figure 4:
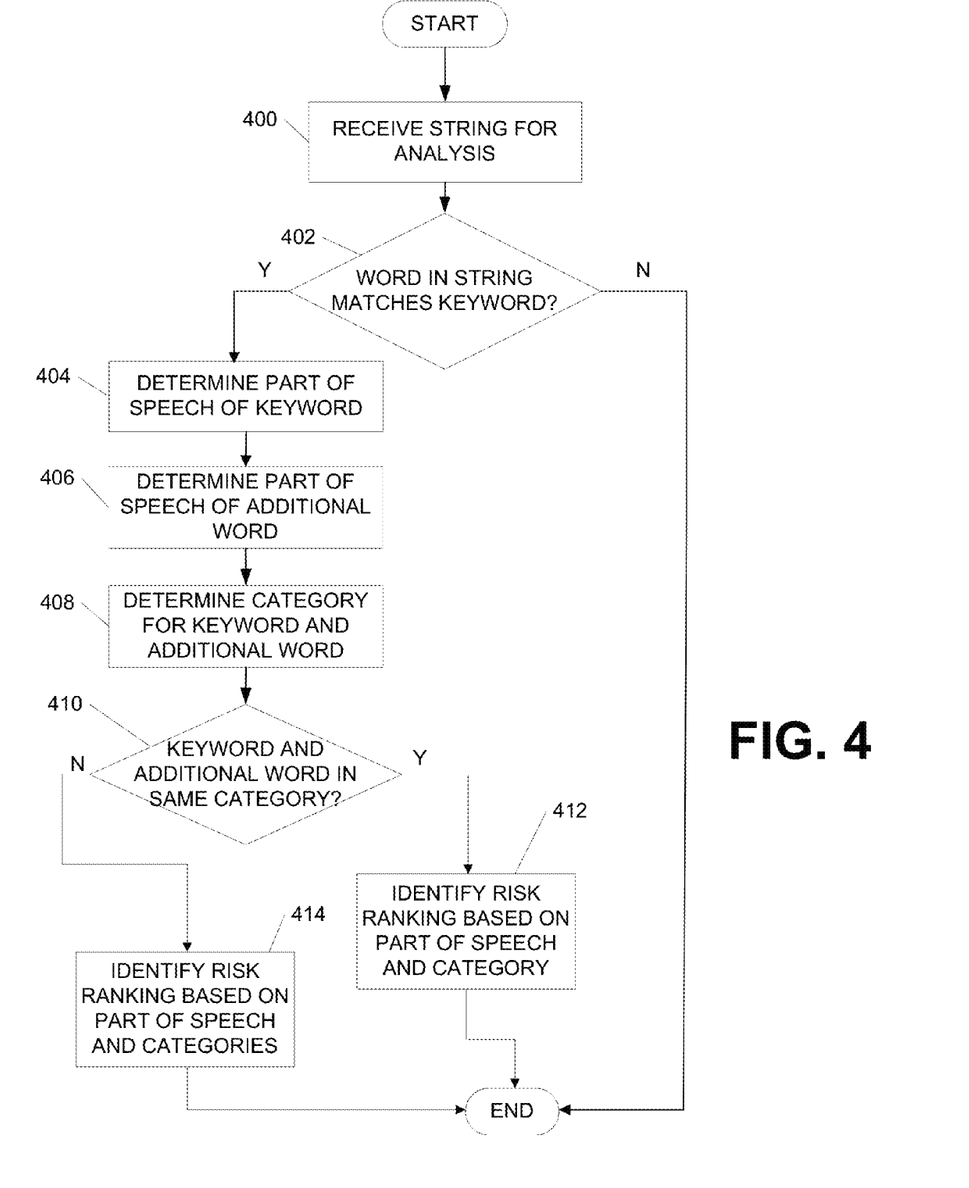
FIG. 4 is an example method of identifying risk associated with a string of terms according to one or more aspects described herein.

FIG. 4 illustrates one example method of implementing the risk identification system. In step 400, a string of terms is received for analysis, such as by parsing module 314 in FIG. 3. As discussed above, the string of terms may be a search query, such as an Internet search query input into a search engine, text from an email or other electronic communication, and the like. The string may be parsed as discussed above and, in step 402, a determination may be made as to whether one or more terms in the string matches a keyword. If none of the words in the string match any keywords, the process may end. For instance, if none of the terms match any of the keywords identified within the system, the string may be considered to pose a low or minimal risk to the entity and, thus, would not undergo any further processing. In some examples, a risk rating may be identified for the string of terms and the rating may be a low or the lowest possible ranking, thereby indicating the lowest level of identified risk.

If, in step 402, a determination is made that one or more of the terms matches a keyword, the part of speech of the matching word may be determined in step 404. As discussed above, determining a part of speech of a word in the string may aid in identifying risk associated with the string. For instance, some words, when used as a first part of speech, may indicate little or no risk. However, when used as another part of speech, the word may indicate increased or high risk. For instance, the term "bypass" may be used as a noun in a variety of contexts that would indicate minimal risk (e.g., bypass on a highway, heart bypass, and the like). However, when used as a verb, "bypass" may indicate a user is attempting to circumvent one or more security measures put in place by the entity. For instance, the user may be conducting a search to identify ways to circumvent or bypass a website block instituted by the entity. Accordingly, determining a part of speech may aid in determining the intent of the user when the string of terms was used (e.g., was the user attempting to circumvent security measures or simply conducting research to avoid traffic).

In another example, the term "resume" may be used to as a verb to indicate taking up an action but may also be used as a noun "resume" (albeit without the appropriate accent marks to indicate the French origin which often do not appear when the term is used on English language keyboards) to describe a person's summary of their word experience, and the like. A user searching or including text in an email including the term "resume" may be using the term as a verb which would likely indicate minimal or little risk. However, if the term is being used as a noun, it may indicate that the user is looking for another job or position and, in this instance, may be using entity resources to conduct a job search, apply for jobs, and the like, which would pose a higher risk to the entity (e.g., the person may be leaving the position, the person may have access to confidential or sensitive information, and the like).

In step 406, a part of speech of an additional word in the string is determined. For instance, if the keyword is identified as a verb, the system (such as the part of speech module 310) may identify the term used as a noun in the string. This may aid in providing additional information about the risk associated with the string. For instance, if the term "bypass" matches a keyword and is identified as a verb, the system may identify the noun in the string. For instance, if the noun is "website" that may indicate that the user is looking to bypass one or more Internet blocks that are implemented by the entity and the string may pose a risk to the entity. Alternatively, if the noun is "traffic" the user may simply be looking for ways to avoid traffic and the string would appear to pose little risk to the entity.

In step 408, a category of the keyword and the at least one additional word may be identified or determined. As discussed above, various words (e.g., keywords, other common words associated with risk, and the like) may be sorted into categories, such as categories of type of risk. Some example categories may include:
1. Behavior—this category may include various keywords or other words indicating an action or behavior associated with the user that might involve risk. For instance, behavior may include terms indicating the user is looking for another job.
2. Information Technology Sabotage—this category may include various keywords or other words indicating the user may be a technical insider and may be looking to use his/her insider knowledge in an unauthorized manner. For instance, the user may be looking to download confidential or sensitive information to a portable drive in order to transmit it outside of the entity.
3. Unauthorized access—this category may include various words or keywords indicating the user intends or is involved in unauthorized activity such as theft, misuse of company information, and the like.
4. Intellectual property theft—this category may include various words or keywords indicating that the user is or plans to attempt to bypass one or more controls implemented by the entity. For instance, the user may be attempting to access information he/she is not authorized to access or may be attempting to circumvent one or more security measures implemented by the entity.

Although four categories are described herein, more or fewer, as well as other, categories may be used with the risk identification system without departing from the invention.

In step 410, a determination may be made as to whether the determined category for the keyword (for which the part of speech has been determined) and the determined category for the at least one additional word (for which the part of speech has been determined) are the same category. In some examples, the keyword and the additional word being in the same category may indicate an increased or higher potential risk. For instance, if two words are within the same category then it increases the likelihood that the string of terms being analyzed is associated with user activity that is not appropriate on an entity provided computing device (e.g., unauthorized, ill-advised, or the like). Accordingly, if, in step 410 a determination is made that the two words are within the same category, then, in step 412 a risk level or rating associated with the text being analyzed may be determined. The risk rating may be determined based on the identified terms, identified parts of speech, and/or the determined category.

If, in step 410, a determination is made that the terms are not in the same category, then a risk rating associated with the string being analyzed is determined in step 414. The risk level may be based, at least in part, on the determined part of speech and the determined category for each term.

Figure 5:
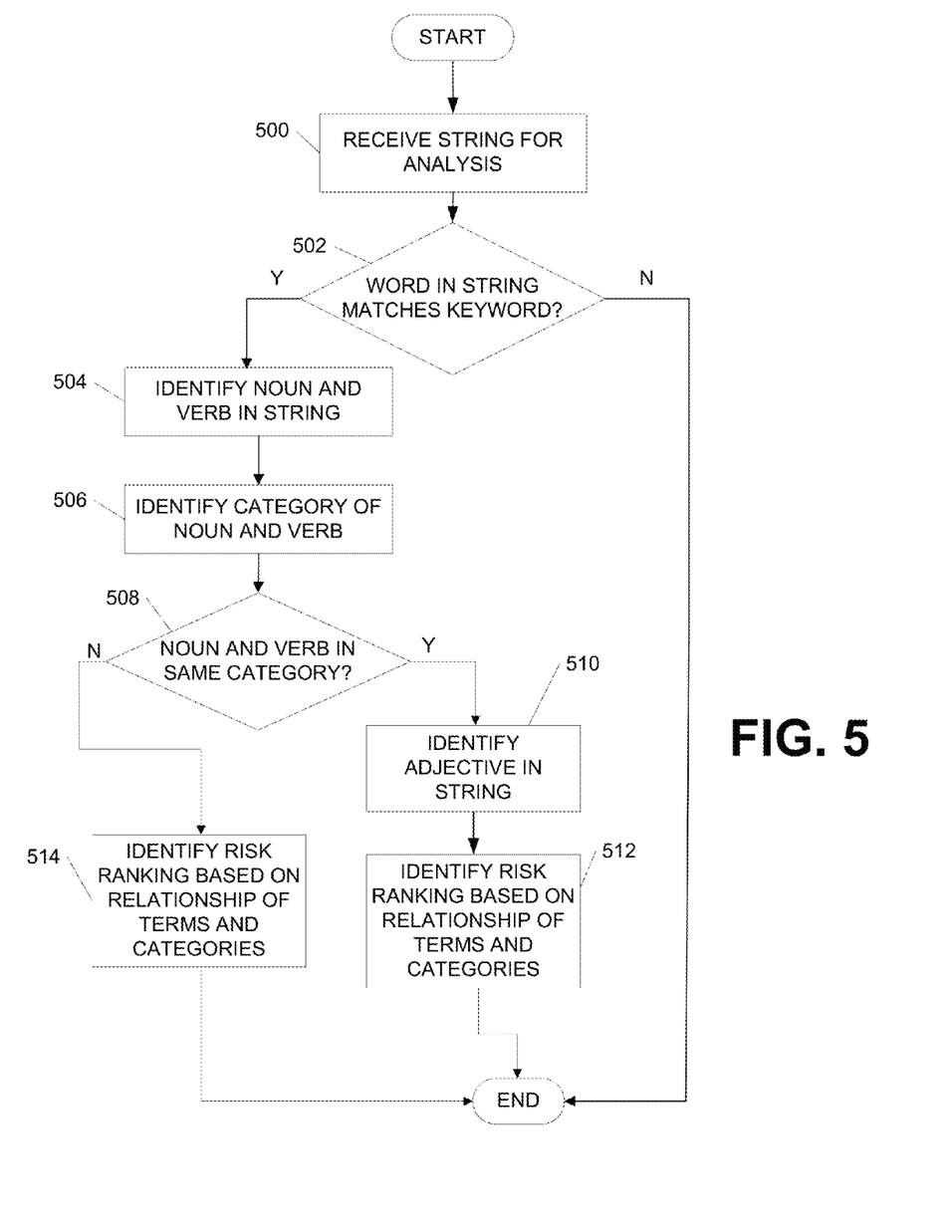
FIG. 5 is another example method of identifying risk associated with a string of terms according to one or more aspects described herein.

FIG. 5 illustrates another example method of implementing the risk identification system described herein. In step 500 a string of terms is received for analysis. Similar to the arrangements discussed above, the string may include a search query, such as from an Internet search engine, text from an email or other electronic communication (e.g., SMS message) and the like. In step 502, the string may be parsed and a determination may be made as to whether one or more of the words in the string matches a keyword listing of the system. If none of the words being analyzed match any keywords, the process ends and no further action or processing may be performed on the string.

Alternatively, if in step 502, a determination is made that the string does include a term matching a keyword, then a noun and a verb in the string may be identified in step 504. For instance, the noun and verb may be identified by the system, such as by a part of speech module 310. In step 506, a category of each of the identified noun and the identified verb may be determined. The categories identified may be similar to the categories discussed above or may include other categories.

In step 508 a determination may be made as to whether the noun and verb are in the same category. Similar to the arrangements above, the identified noun and verb of the same category may indicate an increased risk from a string in which the noun and verb are in different categories. If the noun and verb are not in the same category, the risk associated with the string may be determined in step 514 based on the term and the categories into which the terms (e.g., the identified noun and verb) are placed.

If, in step 508, the noun and verb are in the same category, an adjective may be identified in the string in step 510. Identification of the adjective (e.g., the term acting as the adjective in the sentence) may aid in identifying a risk level associated with the string because it may indicate the intent of the user. For instance, if the phrase "download confidential information" is input into an Internet search engine, the noun "information" and verb "download" may be in the same category and may indicate a risk. However, the addition of the adjective "confidential" raises that identified risk rating.

Once the adjective is identified and evaluated, a risk level may be determined for the string in step 512. The risk level may be determined based on the terms and categories of each term. For instance, the relationship of the terms (e.g., parts of speech of each term, categories, and the like) may aid in identified the risk level associated with the string being analyzed.

Figure 6:
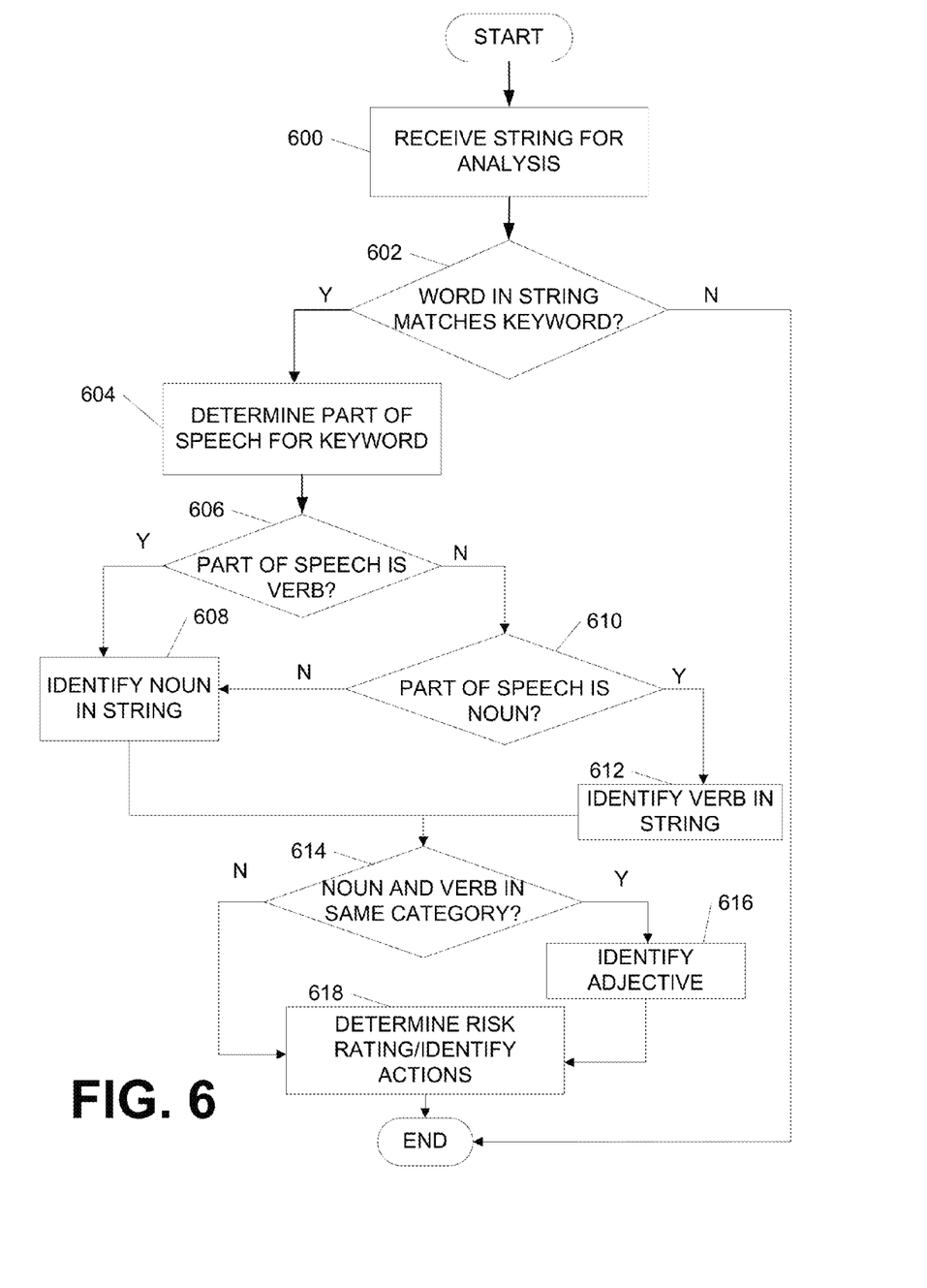
FIG. 6 is yet another example method of identifying risk associated with a string of terms according to one or more aspects described herein.

FIG. 6 illustrates yet another example method of implementing the risk identification system described herein. In step 600, a string of terms is received for analysis and in step step 602 a determination is made as to whether the string includes a keyword. If so, the part of speech of the keyword is determined in step 604.

In step 606, a determination is made as to whether the part of speech of the word matching the keyword is a verb. If so, the system may identify a noun in the string in step 608. If, in step 606, the part of speech of the term matching the keyword is not a verb, a determination is made in step 610 as to whether the term matching the keyword is a noun. If not, the process moves to step 608 to identify the noun in the string. If, in step 610, the term is a noun, then, in step 612, a verb in the string may be identified. In some instances, identifying the noun and verb in a string may include identifying a category of the noun and verb, similar to the arrangements discussed above.

In step 614, a determination is made as to whether the noun and verb are in the same category. If not, a risk level of rating of the string is determined in step 618. The risk rating may be based on the terms, categories and relationship between the terms. If, in step 614, the noun and verb are in the same category, an adjective in the string may be identified in step 616. The risk rating of the string may then be determined in step 618 and may be based on the terms (e.g., noun, verb and adjective), category, and relationship between the terms.

In step 618, any additional processing or actions associated with the string may be identified. For instance, based on the risk level or risk rating determined, one or more additional processing steps or further actions may be identified and/or implemented to mitigate the identified risk. Although the step of identifying additional processing is discussed in association with the method illustrated in FIG. 6, the step of identifying additional processing and actions may be performed in any of the methods described herein (e.g., methods illustrated in FIG. 4 or 5) or in any implementation of the risk identification system.

Figure 7:
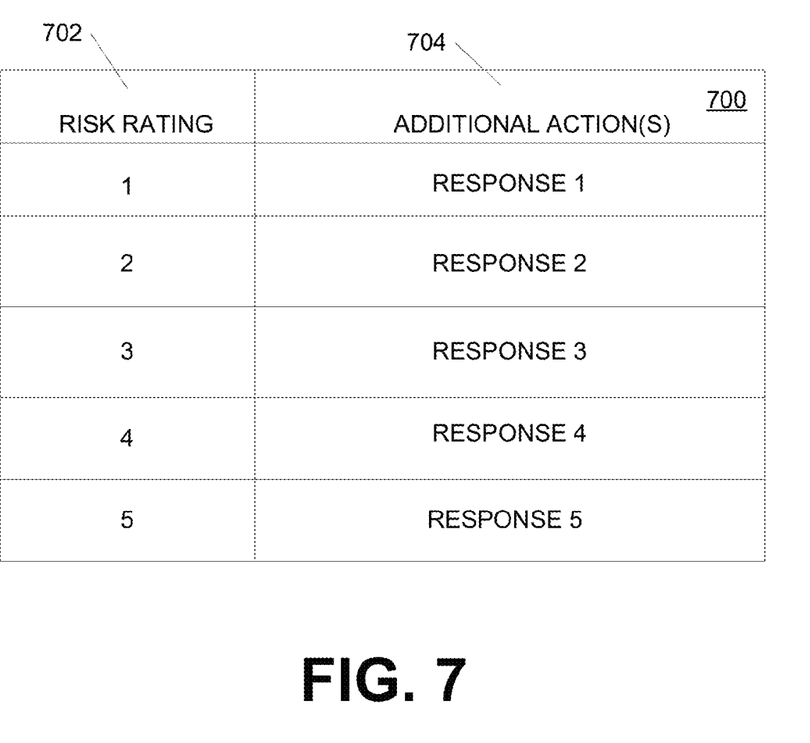
FIG. 7 illustrates one example table indicating identified risk ratings and additional actions that may be implemented based on the risk rating according to one or more aspects described herein.

FIG. 7 illustrates one example table 700 listing the identified risk ratings and responses taken to a particular risk rating. Although five risk ratings are shown in FIG. 7, more or fewer risk rating levels may be used without departing from the invention.

Column 702 identifies the various risk ratings that may be identified for a string of terms being analyzed. The ratings shown extending from 1 to 5 and may include 1 being the highest risk and 5 being the lowest risk, or vice versa with 1 being the lowest risk and 5 being the highest risk. For simplicity, the remainder of the discussion of FIG. 7 will treat the risk ratings as 1 being the lowest risk and 5 being the highest risk.

Accordingly, one string is analyzed and a risk rating is determined, any additional processing or actions may be determined from table 700 or similar tables. For instance, a risk rating of 1 may be identified for a string. The risk rating of 1 may be identified if, for example, there is no word in the string that matches a keyword. In response to a risk rating of 1, response 1 from additional action(s) column 704 may be implemented. Because rating 1 is the lowest risk, response 1 may include actions such as continuing to monitor the user as normal or take no further action.

In another example, a risk rating of 3 may be identified in situations in which, for example, there is a keyword match but the noun and verb in the string are not in the same category. In this example, response 3 may be implemented and may include further review of search queries or communications associated with the user. Response 3 may also include placing tighter controls on the user (e.g., monitor new communications more frequently, log all activity of the user, and the like), further processing the string of terms to confirm risk associated with the string of terms, and the like.

In yet another example, a risk rating of 5 may be identified in situations in which, for instance, there is a keyword match and the noun and verb are in the same category. Risk rating of 5 may also include an adjective indicative of malicious or otherwise unauthorized intent of the user. Accordingly, response 5 may be implemented and the situation may be escalated to confront the user, seize his or her entity provided computing devices, modify permissions or access to information of the user, and the like.

The risk identification methods, systems, and the like, described herein provide an accurate and objective way to identify risk associated with user of a computing device. As discussed above, by determining different parts of speech of terms in a string of terms, and thereby understanding the relationship between the terms, risk can be more accurately identified and additional processing steps may be better tailored to the particular risk. Because fewer false positives may be identified by the system described herein than by conventional systems and methods, a more efficient and accurate system and method of determining risk is provided.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one

What is claimed is:

1. A method, comprising:
   receiving, by a risk identification system including at least one computing device having at least one processor and at least one memory coupled to the processor, a string of terms;
   determining, by the at least one computing device of the risk identification system, whether the string of terms includes at least one word matching a keyword of a keyword listing;
   responsive to determining that the string of terms includes at least one word matching the keyword, identifying, by the risk identification system, at least a noun and a verb in the string of terms;
   identifying, by the at least one computing device of the risk identification system, a category of risk associated with the identified noun and a category of risk associated with the identified verb;
   determining, by the at least one computing device of the risk identification system, whether the identified category of risk associated with the identified noun and the identified category of risk associated with the identified verb are a same category of risk;
   responsive to determining that the identified category of risk associated with the identified noun and the identified category of risk associated with the identified verb are the same category, determining, by the risk identification system, a first risk rating of the received string of terms including the identified noun and the identified verb, the first risk rating being based on the identified noun, the identified verb and the same category; and
   responsive to determining that the identified category of risk associated with the identified noun and the identified category of risk associated with the identified verb are different categories, determining, by the risk identification system, a second risk rating of the received string of terms including the identified noun and the identified verb, the second risk rating being based on the identified noun, the identified verb, the identified category of risk associated with the noun and the identified category of risk associated with the verb, the second risk rating being different from the first risk rating.

2. The method of claim 1, further including:
   identifying, by the at least one computing device of the risk identification system, an adjective in the string of terms; and
   determining, by the risk identification system, a third risk rating of the received string of terms based on the identified noun, identified verb, identified category of risk associated with the noun, identified category of risk associated with the verb and the identified adjective, the third risk rating being different from at least one of the first risk rating and the second risk rating.

3. The method of claim 1, wherein the categories of risk include at least one of: behavior, information technology sabotage, unauthorized access, and intellectual property theft.

4. The method of claim 1, further including identifying, by the at least one computing device of the risk identification system, an additional action to implement based on the identified risk rating.

5. The method of claim 4, wherein the additional action includes altering access to information available to a user associated with the string of terms.

6. The method of claim 1, wherein the string of terms is input into a user computing device by a user, wherein the user computing device is different from the at least one computing device of the risk identification system.

7. The method of claim 6, wherein the user is an employee of an entity and the computing device is provided to the user by the entity for use as an employee of the entity.

8. An apparatus, comprising:
   at least one processor; and
   a memory storing computer-readable instructions that, when executed by the at least one processor, cause the apparatus to:
      receive a string of terms;
      determine whether the string of terms includes at least one word matching a keyword of a keyword listing;
      responsive to determining that the string of terms includes at least one word matching the keyword, identify at least a noun and a verb in the string of terms;
      identify a category of risk associated with the noun and a category of risk associated with the verb;
      determine whether the identified category of risk associated with the identified noun and the identified category of risk associated with the identified verb are a same category of risk;
      responsive to determining that the identified category of risk associated with the identified noun and the identified category of risk associated with the identified verb are the same category, determine a first risk rating of the received string of terms including the identified noun and the identified verb, the first risk rating being based on the identified noun, the identified verb and the same category; and
      responsive to determining that the identified category of risk associated with the identified noun and the identified category of risk associated with the identified verb are different categories, determine a second risk rating of the received string of terms including the identified noun and identified verb, the second risk rating being based on the identified noun, the identified verb, the identified category of risk associated with the noun and the identified category of risk associated with the verb, the second risk rating being different from the first risk rating.

9. The apparatus of claim 8, further including instructions that, when executed, cause the apparatus to:
   identify an adjective in the string of terms and determine a third risk rating of the string of terms based on the identified noun, identified verb, identified category of risk associated with the noun, identified category of risk associated with the verb and the identified adjective, the third risk rating being different from at least one of the first risk rating and the second risk rating.

10. The apparatus of claim 8, wherein the categories of risk include at least one of:
    behavior, information technology sabotage, unauthorized access, and intellectual property theft.

11. The apparatus of claim 8, further including instructions that, when executed, cause the apparatus to identify an additional action to implement based on the identified risk rating.

12. The apparatus of claim 11, wherein the additional action includes altering access to information available to a user associated with the string of terms.

13. The apparatus of claim 8, wherein the string of terms is input into a computing device by a user.

14. The apparatus of claim 13, wherein the user is an employee of an entity and the computing device is provided to the user by the entity for use as an employee of the entity.

15. One or more non-transitory computer-readable media having computer-executable instructions stored thereon that, when executed, cause at least one computing device to:
    receive a string of terms;
    determine whether the string of terms includes at least one word matching a keyword of a keyword listing;
    responsive to determining that the string of terms includes at least one word matching the keyword, identify at least a noun and a verb in the string of terms;
    identify a category of risk associated with the identified noun and a category of risk associated with the identified verb;
    determine whether the identified category of risk associated with the identified noun and the identified category of risk associated with the identified verb are a same category of risk;
    responsive to determining that the identified category of risk associated with the identified noun and the identified category of risk associated with the identified verb are the same category, determine a first risk rating of the received string of terms including the identified noun and the identified verb, the first risk rating being based on the identified noun, the identified verb and the same category; and
    responsive to determining that the identified category of risk associated with the identified noun and the identified category of risk associated with the identified verb are different categories, determine a second risk rating of the received string of terms including the identified noun and the identified verb, the second risk rating being based on the identified noun, the identified verb, the identified category of risk associated with the noun and the identified category of risk associated with the verb, the second risk rating being different from the first risk rating.

16. The one or more non-transitory computer-readable media of claim 15, further including instructions that, when executed, cause the at least one computing device to:
    identify an adjective in the string of terms; and
    determine a third risk rating of the string of terms based on the identified noun, identified verb, identified category of risk associated with the noun, identified category of risk associated with the verb and the identified adjective, the third risk rating being different from at least one of the first risk rating and the second risk rating.

17. The one or more non-transitory computer-readable media of claim 15, wherein the categories of risk include at least one of: behavior, information technology sabotage, unauthorized access, and intellectual property theft.

18. The one or more non-transitory computer-readable media of claim 15, further including instructions that, when executed, cause the at least one computing device to identify an additional action to implement based on the identified risk rating.

19. The one or more non-transitory computer-readable media of claim 18, wherein the additional action includes altering access to information available to a user associated with the string of terms.

20. The one or more non-transitory computer-readable media of claim 15, wherein the string of terms is input into a computing device by a user, and wherein the user is an employee of an entity and the computing device is provided to the user by the entity for use as an employee of the entity.

* * * * *